United States Patent [19]

Oishi et al.

[11] 3,721,830

[45] March 20, 1973

[54] PULSE DIP CARRIER SYSTEM USING AC DISTRIBUTION LINE

[75] Inventors: Hiroshi Oishi; Fumio Aoki; Shigeru Kawano, all of Chiyodaku, Tokyo; Setsuo Kikuta; Masami Shirakawa, both of Shinagawaku, Tokyo, all of Japan

[73] Assignees: The Tokyo Electric Power Co. Inc.; Osaki Electric Co. Ltd., Tokyo, Japan

[22] Filed: June 18, 1971

[21] Appl. No.: 154,435

[52] U.S. Cl. ...................................307/3, 340/310
[51] Int. Cl. ...............................................G08c 19/24
[58] Field of Search .........307/3; 340/310, 216, 345; 332/9, 10; 317/146, 147

[56] References Cited

UNITED STATES PATENTS

| | | | |
|---|---|---|---|
| 3,011,102 | 11/1961 | Balan | 340/310 X |
| 3,273,018 | 9/1966 | Goldberg | 321/45 DT |
| 3,594,584 | 7/1971 | Woods | 307/3 |
| 3,211,111 | 10/1965 | Morley | 340/310 X |

FOREIGN PATENTS OR APPLICATIONS 1,092,638    11/1967    Great Britain.......................340/310

*Primary Examiner*—Robert K. Schaefer
*Assistant Examiner*—William J. Smith
*Attorney*—Eric H. Waters et al.

[57] ABSTRACT

A pulse dip carrier system comprises a series circuit having an electronic switch and a capacitor and being connected in parallel to an AC distribution line, and a phase shifter circuit for controlling the electronic switch by the phase shifter output. The electronic switch closes under the control of the phase shifter circuit when the phase of the line voltage of AC distribution line to a point of the zero instantaneous value thereof comes to a predetermined angle, a charging current flows in the capacitor when the electronic switch is closed whereby steep pulse dip is generated on the wave of the line voltage.

5 Claims, 11 Drawing Figures

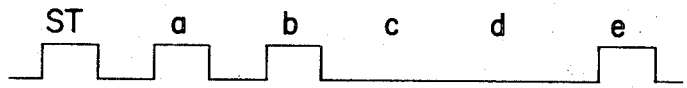
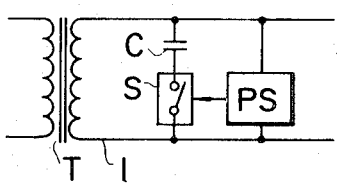
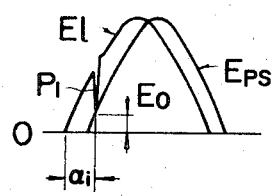
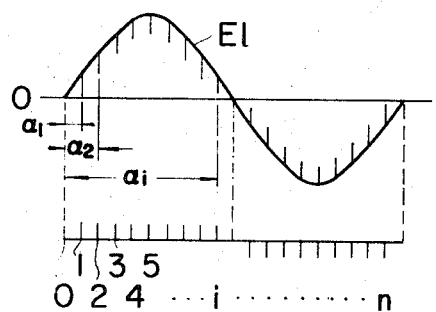
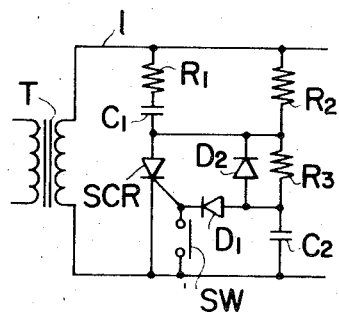
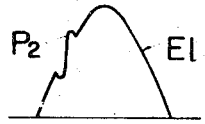
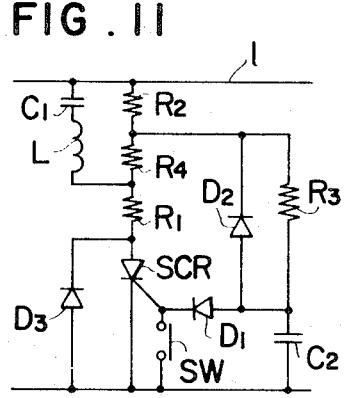

PULSE DIP CARRIER SYSTEM USING AC DISTRIBUTION LINE

This invention relates to systems using A.C. distribution lines to carry signals for remote measurements, remote monitoring, remote control, data transmission, etc.

As is known, the ripple frequency carrier system and voltage dip carrier system have been used for remote centralized control. In the ripple frequency carrier system, a signal wave whose frequency is several times higher than the power source frequency is superposed on a power source wave for transmission. In a fundamental circuit of this carrier system, the ripple signal generated by a ripple frequency generator is code-modulated by a modulator according to the code provided from a code generator circuit whereby a signal wave is formed. This signal wave is superposed on the power source wave of a distribution line by way of a coupling transformer. Also employed are a distribution transformer, and a load. The distribution line comprises numerous branch lines, which cause branch loss. Because of this branch loss, the capacity of the ripple frequency generator must be large enough and, as a result, a large scale installation is inevitable. This requires an extra burden on the power users who desire to send signals to the central station. This is why the ripple frequency carrier system has been in use only for the purpose of centralized control the installation for which can be used in common. Furthermore, the code transmission speed available with this carrier system is as low as 0.5 to 2.5 seconds per bit.

According to the voltage dip carrier system, only a limited part of the wave of the power source wave is given a 2 to 3 percent of voltage drop whereby a voltage drop portion is formed for the transmission of a signal code.

A fundamental circuit of this carrier system is one wherein a controller is operated according to the code supplied from a code generator to turn on or off a switch and thus short-circuit the secondary circuit of a coupling transformer or connect a resistor to the secondary circuit thereof whereby the load current is utilized to produce a line voltage drop. This carrier system is capable of code transmission at a speed of 20 milliseconds per bit (or 50 bits/sec.) at maximum. However, it is impossible to send signal over the line unless the load current is present. Furthermore the resistance must be changed according to the load current in order to prevent the voltage drop portion from being varied due to the change of the load current. In addition, power is consumed to an amount corresponding to the voltage drop portion. In short, the use of the voltage dip carrier system is limited to centralized control applications, as in the ripple frequency carrier system.

According to these carrier systems in code transmission operation, a start pulse is sent prior to information pulses and coding and decoding are done based on the start pulse. Practically, however, a pseudo start pulse tends to become present immediately before the start pulse due to line noise or, in some cases, the start pulse disappears. In such event, the pulse *a* or *b* subsequent to the start pulse is taken for the start pulse, and the pulse train stands for a false information. This leads to serious problems.

In view of the foregoing, a general object of this invention is to provide a pulse dip carrier system which is simple in construction and thus serves to reduce the size of the installation, said carrier system being capable of transmitting signals regardless of whether load current is present or absent and being operable free of line noise during code transmission.

According to the invention, an electronic switch is used and, when the electronic switch is closed, a charging current is supplied to a capacitor connected in parallel to the AC distribution line whereby an instantaneous voltage variation is produced in the line voltage of the distribution line and thus a pulse dip is formed. The pulse dip carrier system of this invention can be realized by simple arrangement, and the energy of the power source wave on the distribution line can be utilized directly. The voltage variation is so instantaneous that the power consumed thereby is very little. This makes it possible to minimize the size of the system as a whole. Another advantage of the system of this invention is its use of a phase shifter circuit to control the electronic switch. This serves to simplify the circuitry. Furthermore, since the level of the pulse dip can be arbitrarily changed by controlling the capacitor charging current, a sufficiently large S/N ratio can be obtained. The pulse dip can be transmitted regardless of whether the load current is present or absent because the pulse dip is formed irrespective of the load current. The phase of the pulse dip is determined on the basis of the point of zero instantaneous value of the line voltage of AC distribution line and, accordingly, the pulse dip is perfectly free of line noise.

BRIEF DESCRIPTION OF THE DRAWING:

FIG. 5 shows a signal pulse train used in code transmission according to the conventional carrier system.

FIG. 6 is a schematic circuit diagram showing a fundamental arrangement of the system of this invention.

FIG. 7 shows an example of a modulated waveform according to this invention.

FIG. 8 is a diagram illustrating the positional relationship between the pulse dip and phase according to this invention.

FIG. 9 shows an example of pulse dip generator circuit used for the purpose of this invention.

FIG. 10 shows another example of a modulated waveform according to this invention; and FIG. 11 shows another example of pulse dip generating circuit used for the purpose of the invention.

DETAILED DESCRIPTION OF THE INVENTION

Figure 1:
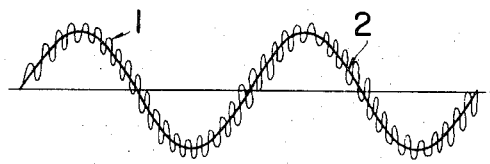
FIG. 1 shows a modulated waveform according to the conventional ripple frequency carrier system.
Figure 2:
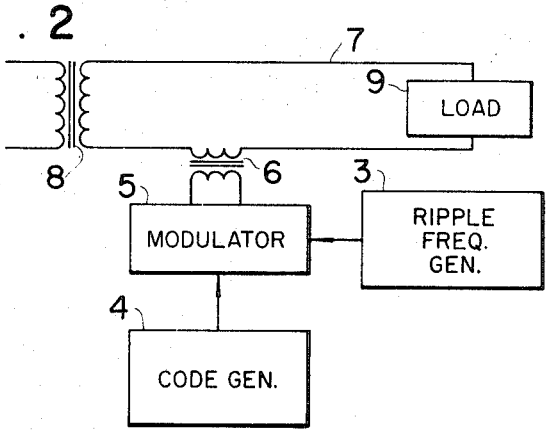
FIG. 2 is a schematic circuit diagram showing a conventional ripple frequency carrier system.

In the ripple carrier system, as shown in FIG. 1, a signal wave 1 whose frequency is several times higher than the power source frequency is superposed on a power source wave 2 for transmission. FIG. 2 shows a fundamental circuit of this carrier system wherein the ripple signal generated by a ripple frequency generator 3 is code-modulated by a modulator 5 according to the code provided from a code generator circuit 4 whereby a signal wave 1 is formed. This signal wave 1 is superposed on the power source wave 2 of a distribution line 7 by way of a coupling transformer 6. In FIG. 2, the reference 8 denotes a distribution transformer, and 9 a load. The distribution line comprises numerous branch lines, which cause branch loss. Because of this branch loss, the capacity of the ripple frequency generator 3 must be large enough and, as a result, a large scale installation is inevitable.

Figure 3:
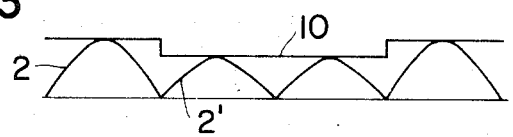
FIG. 3 shows a modulated waveform according to the conventional voltage dip carrier system.

While, according to the voltage dip carrier system, as shown in FIG. 3, only a limited part of the wave 2' of the power source wave 2 is given a 2 to 3 percent of voltage drop whereby a voltage drop portion 10 is formed for the transmission of signal code.

Figure 4:
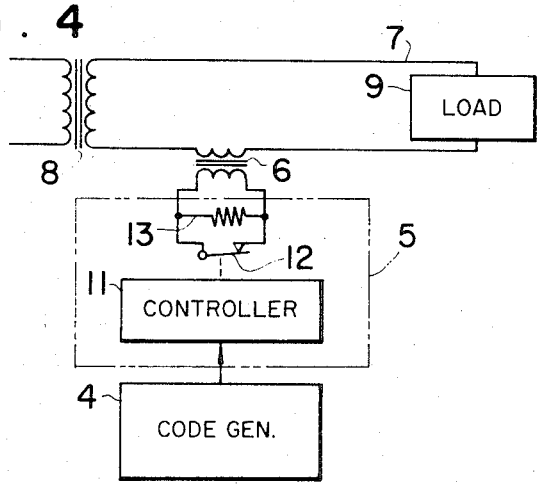
FIG. 4 is a schematic circuit diagram showing a conventional voltage dip carrier system.

FIG. 4 shows a fundamental circuit of this carrier system wherein a controller 11 is operated according to the code supplied from a code generator 4 to turn on/off a switch 12 and thus short-circuiting the secondary circuit of a coupling transformer 6 or connecting a resistor 13 to the secondary circuit thereof whereby the load current is utilized to produce a line voltage drop. This carrier system is capable of code transmission at a speed of 20 milliseconds per bit (or 50 bits/sec.) at maximum. However, it is impossible to send signal over the line unless the load current is present. Furthermore the resistance 13 must be changed according to the load current in order to prevent the voltage drop portion 10 from being varied due to the change of the load current. In addition power is consumed to an amount corresponding to the voltage drop portion 10. In short, the use of the voltage dip carrier system is limited to centralized control applications, like in the ripple frequency carrier system.

According to these carrier systems in code transmission operation, a start pulse ST is sent prior to information pulses as shown in FIG. 5, and coding and decoding are done based on the start pulse. Practically, however, a pseudo start pulse tends to become present immediately before the start pulse ST due to line noise or, in some cases, the start pulse disappears. In such event, the pulse $a$ or $b$ subsequent to the start pulse is taken for the start pulse, and the pulse train stands for a false information.

In FIG. 6, there is shown a fundamental circuit of the system of this invention wherein a series circuit comprising a capacitor C and an electronic switch S is connected between lines of an A.C. distribution system, and a phase shifter circuit PS for controlling the electronic switch S is connected across the same lines. The reference T denotes a distribution transformer. The voltage $E_{ps}$ of the phase shifter circuit PS has a phase difference with respect to the line voltage $El$ of the A.C. distribution line $l$ as shown in FIG. 7. It is assumed that the electronic switch S closes when the voltage $E_{ps}$ takes the value $E_o$. Under this condition, the electronic switch S closes at the phase $\alpha i$ of the line voltage El, and a large charging current flows in the capacitor C to bring about an instantaneous short-circuit across lines. As a result, an instantaneous voltage variation is produced in the line voltage $El$. The period of this voltage variation is one to several microseconds and accordingly a very thin pulse dip $P_1$ is formed. The foregoing statement that " . . . a large charging current flows to bring about an instantaneous short-circuit across lines" is a theoretical expression. Practically, however, the charging current is very small since a charging current limiting resistor is inserted therein in series with the capacitor C. The charging current is changed so quickly (i.e., the order of $10^{-6}$ second) that the power source response cannot follow the change, and a large voltage variation takes place.

As shown in FIG. 8, n-number of pulse dip generating points are determined at specific phase intervals over one cycle of the line voltage, based on the zero volt point of instantaneous value, and the pulse dip is generated at each pulse dip point according to the information to be transmitted. The pulse dip is free of noise and is constant because the phases $\alpha 1, \alpha 2, \ldots, \alpha i, \ldots$ by which the individual pulse dip positions are determined are based on the zero volt point of instantaneous value of the line voltage $El$. As a consequence, it becomes possible to realize high speed data transmission (such as 2,000 bits/second). The pulse dip generation is repeated at each cycle of the line voltage $El$ and, hence, automatic scanning or repetitive sampling measurement can be done when the pulse dip generating point corresponds to the object to be scanned or measured. FIG. 9 shows a concrete example of pulse dip generator circuit using a thyristor as the foregoing electronic switch. In FIG. 9, the reference $R_1$ denotes a pulse peak value limiting resistor, $R_2$ a resistor used commonly for the phase shifter circuit and the discharging circuit of the capacitor $C_1$, $R_3$ a resistor used for the phase shifter circuit, $C_1$ a pulse generating capacitor, $C_2$ a capacitor for the phase shifter circuit, SCR a thyristor, $D_1$ and $D_2$ diodes, and SW a switch for controlling pulse generating and pulse terminating. When the switch SW is in the on position, pulse generation is stopped. When the switch SW is opened, the phase shifter capacitor $C_2$ is charged via the phase shifter resistors $R_2$ and $R_3$, and the charging voltage reaches the trigger value of the thyristor SCR at the phase $\alpha i$ which is determined by the time constant of $C_2 \cdot (R_2 + R_3)$, to turn on the thyristor SCR. By this, a charging current rushes into the pulse generating capacitor $C_1$. This charging current is so abrupt that the distribution system cannot respond to the charging current whereby a voltage variation is produced in the form of pulse dip $P_1$ on the voltage wave of A.C. distribution line $l$, as shown in FIG. 7. In the above circuit, a transistor may be used instead of thyristor SCR. According to this invention, the phase shifter circuit is an RC circuit in view of economy. It is apparent that a RL circuit or a LC circuit may be used in place of the RC circuit.

The pulse dip $P_1$ shown in FIG. 7 includes a D.C. component and a higher order higher harmonics component. In some cases it is desirable that a pulse dip $P_2$ shown in FIG. 10 which does not include a DC component and a higher order higher harmonics component be generated on the wave of the line voltage instead of the pulse dip $P_1$. An example of the circuit for generating the pulse dip $P_2$ is shown in FIG. 11. An inductance L is connected in series with the pulse generating capacitor $C_1$. In FIG. 11, the same members with the members shown in FIG. 9 are denoted by the same reference letters. $R_2$ and $R_4$ are resistances for flowing the holding current into the thyristor SCR, $D_3$ is a withstand voltage diode for the thyristor SCR. A diode thyristor or other type of thyristor whose breakover voltage is higher than the line voltage El may be substituted for the diode $D_3$. By connection of the inductance L, voltage variation of the line voltage El according to the charge of the pulse generating capacitor $C_1$ forms to be a one cycle sine wave, and thus the A.C. pulse dip $P_2$ as shown in FIG. 10 which reduced the D.C. component and the higher order higher harmonics component is generated on the wave of the line voltage. The A.D. pulse dip $P_2$ can prevent the generation of noise because it includes a little higher harmonics component. On the other hand, the D.C. pulse dip $P_1$ is apt to generate noise because it includes a much higher harmonics component. Furthermore, the A.C. pulse dip $P_2$ can pass through a coupling transformer or a coupling condenser easily after being taken out of the carrier wave at the receiving terminal.

In the system of this invention, when used for code transmission, it is possible to transmit n kinds of information by the use of $nC_1$ (1 out of an $n$)system code. In this code transmission, a one pulse dip generating circuit will suffice for one kind of information. If the king of information is various, an $nC_2$ (2 out of $n$) system or $nC_3$ (3 out of $n$) system code is used. When an $nC_2$ system code is used, two pulse dip generating circuits are required. When an $nC_3$ system code is used, three pulse dip generating circuits are needed. When a $_5C_2$ system code (5 bits/digit) for $m$-digits is employed, $m$ digits of code can be transmitted in $m$ cycle by two pulse dip generating circuits. Furthermore since this $5C_2$ system code is a self-checking code, code error can be prevented by self-check. In addition to these code systems, a binary code system may be used.

We claim:

1. A pulse dip carrier system using A.C. distribution lines, said system comprising a plurality of pulse dip generating circuits, each of said circuits including a series circuit consisting of an electronic switch and a capacitor, and a phase shifter circuit, said series circuit being connected in parallel with the A.C. distribution lines, said electronic switch being connected with said capacitor to control the charging current of said capacitor, said phase shifter circuit being connected with the A.C. distribution line to shift the phase of the line voltage of the A.C. distribution line and being connected with said electronic switch to close when the phase of the line voltage to the point of the zero instantaneous value thereof comes to a predetermined angle, a plurality of pulse dip generating points of said pulse dip generating circuits being determined at specific phase intervals over respective positive and negative half cycle of the line voltage.

2. A pulse dip carrier system in accordance with claim 1 wherein an inductance is connected in series with the capacitor.

3. A pulse dip carrier system in accordance with claim 1 wherein the electronic switch includes a thyristor.

4. A pulse dip carrier system in accordance with claim 3 wherein the switch includes a gate for the thyristor and the thyristor includes a cathode and wherein said phase shifter circuit comprises a series circuit including a resistor and a capacitor and is connected in parallel with the A.C. distribution line, and the latter said capacitor is connected across the gate and cathode of the thyristor.

5. A pulse dip carrier system in accordance with claim 3 comprising a charging current limiting resistor for limiting the charging current to the capacitor, the latter said resistor being inserted into the series circuit comprising the capacitor and thyristor.

* * * * *